United States Patent [19]

Milcent et al.

[11] Patent Number: 5,169,100
[45] Date of Patent: Dec. 8, 1992

[54] MODULAR ASSEMBLY FOR SUPPORTING ELECTRICAL CABLES

[75] Inventors: Bernard Milcent, Beynes; Jean-Marie Le Cunff, Saint Cloud, both of France

[73] Assignee: Dassault Aviation, Paris, France

[21] Appl. No.: 698,828

[22] Filed: May 13, 1991

[30] Foreign Application Priority Data

Jun. 1, 1990 [FR] France ............................ 9006850

[51] Int. Cl.⁵ .................................. F16L 3/00
[52] U.S. Cl. ................................. 248/68.1; 248/73; 248/74.3; 248/224.3
[58] Field of Search ............ 248/68.1, 62, 65, 73, 248/74.3, 58, 70, 477, 475.1, 558, 224.3, 220.2, 314, 205.3; 24/16 PB; 403/91, 97, 98, 103, 165, 359

[56] References Cited

U.S. PATENT DOCUMENTS

| | | | |
|---|---|---|---|
| 1,971,396 | 8/1934 | DeWaide | 248/205.3 |
| 2,161,782 | 6/1939 | Flower | 248/59 |
| 2,539,783 | 1/1951 | Kirk, Jr. | 248/62 |
| 2,949,304 | 8/1960 | Williams | 403/359 X |
| 3,556,447 | 1/1971 | Jenkins | 248/68.1 X |
| 4,768,741 | 9/1988 | Logsdon | 248/74.3 X |
| 4,771,743 | 9/1988 | McDowell | |
| 4,786,025 | 11/1988 | Shuman | 248/558 |
| 4,827,654 | 5/1989 | Roberts | 248/514 X |
| 5,014,939 | 5/1991 | Kraus et al. | 248/70 |
| 5,022,104 | 6/1991 | Miller | 248/558 X |

FOREIGN PATENT DOCUMENTS

| | | | |
|---|---|---|---|
| 516939 | 10/1978 | Australia . | |
| 0054478 | 6/1982 | European Pat. Off. . | |
| 2005758 | 4/1979 | United Kingdom | 248/68.1 |
| 1545781 | 5/1979 | United Kingdom | 403/359 |

Primary Examiner—Karen J. Chotkowski
Attorney, Agent, or Firm—Stevens, Davis, Miller & Mosher

[57] ABSTRACT

The assembly is composed of elements, each comprising at least one stud (12) and/or bush (3) which are complementary and which are designed to be coupled by insertion one in the other. The stud (12) has axial teeth (15) and a rib (16). The teeth (15) interact with complementary teeth of a bush, to define a relative angular orientation of two elements joined together. The rib (16) is forced into a groove (9) of the other element to ensure the axial fastening of the two elements.

The invention is used for the cabling of an aircraft.

10 Claims, 3 Drawing Sheets

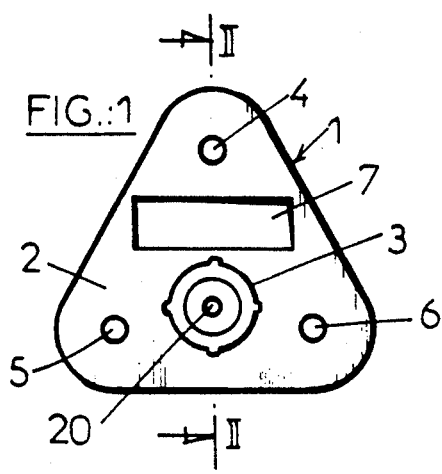
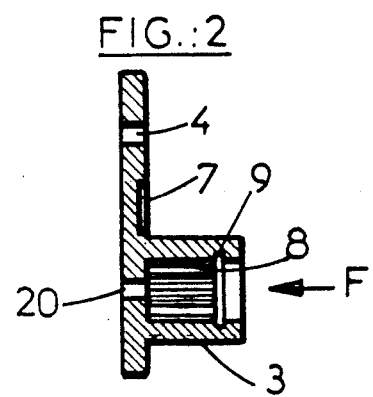
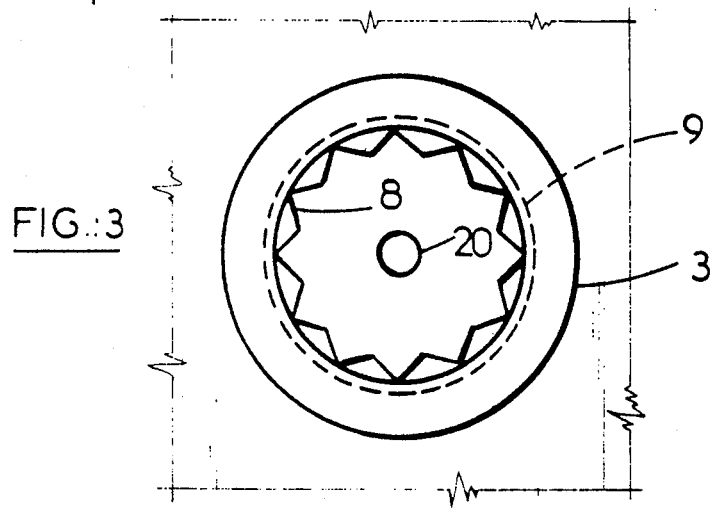
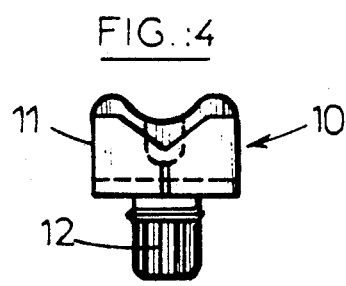
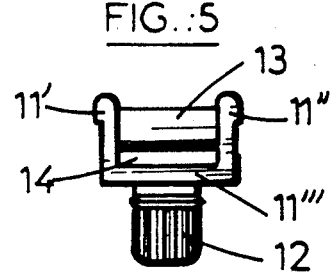
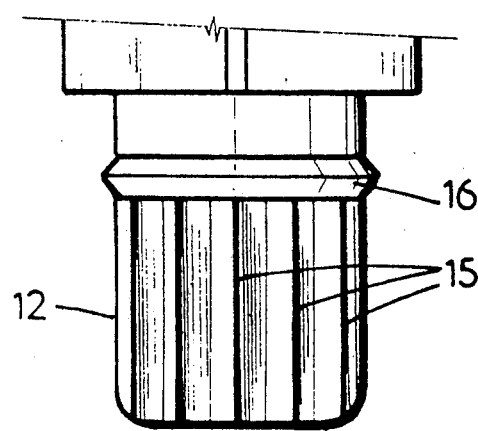

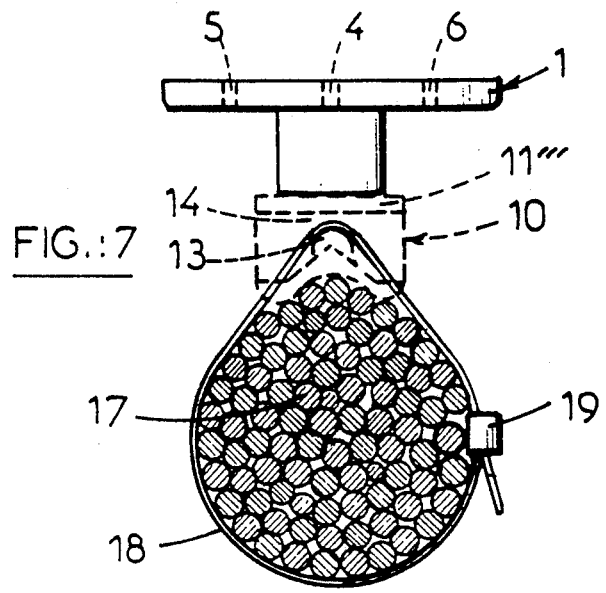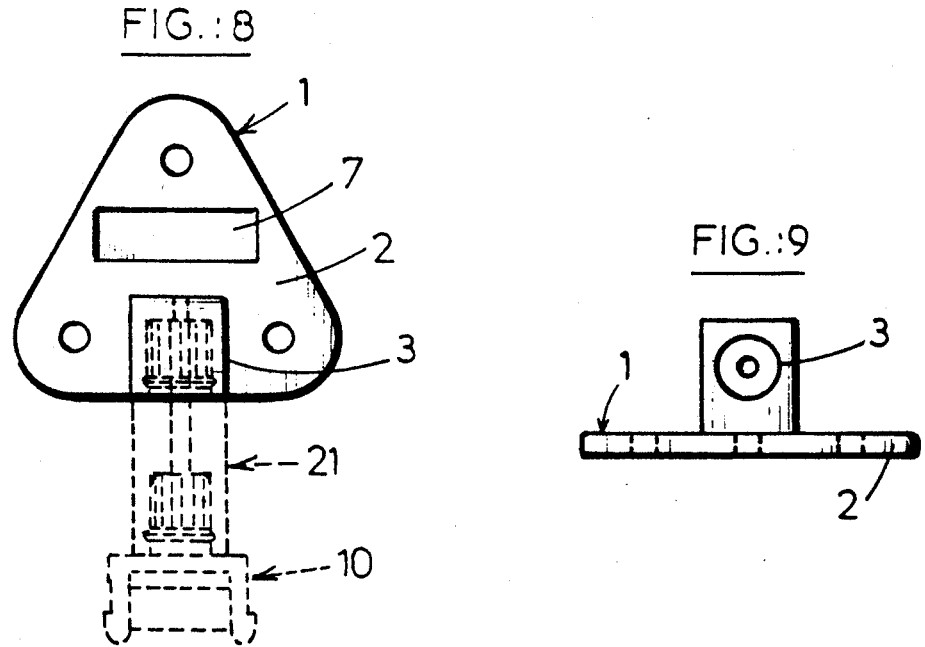

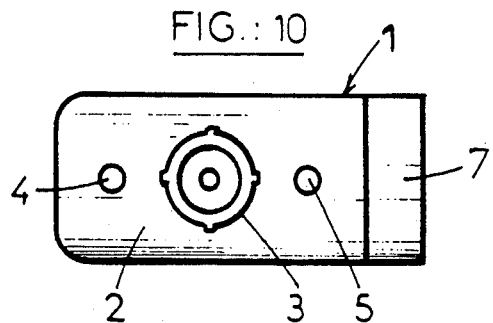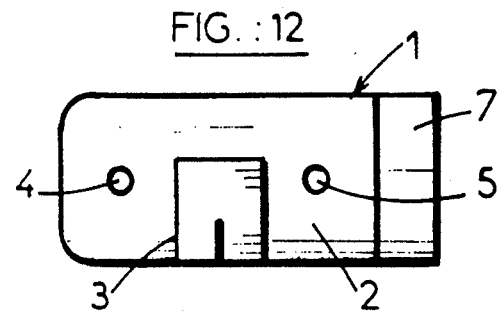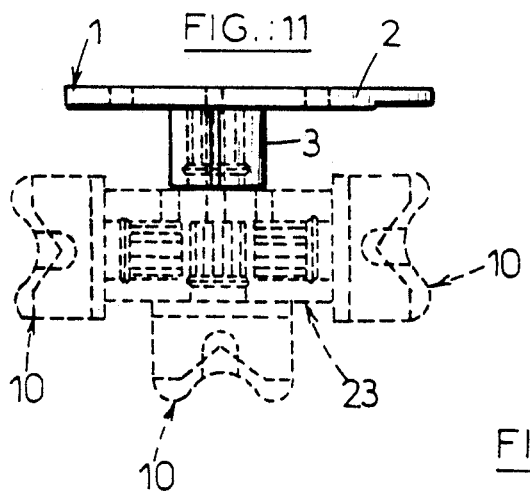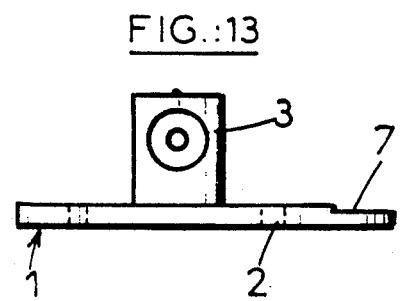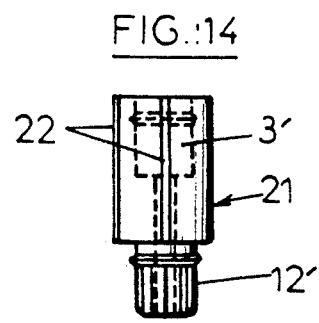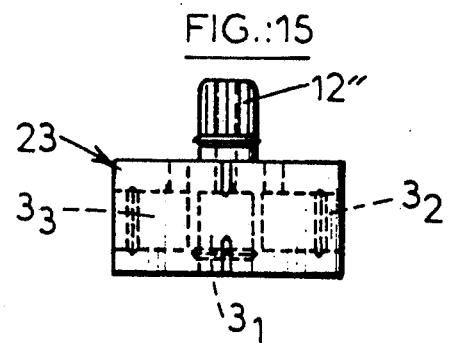

MODULAR ASSEMBLY FOR SUPPORTING ELECTRICAL CABLES

BACKGROUND OF THE INVENTION

The present invention relates to a cable-supporting assembly and more particularly to such a modular assembly intended for supporting electrical cables in an aircraft.

Modern aircraft are equipped with numerous electrical supply and control appliances connected to cables running along internal partitions or walls of the airframe. The cumulative length of these cables amounts to kilometers. They are often gathered in bundles held together by straps passing through cradles which are themselves fixed to supports secured to these partitions or walls.

At the present time, many types of such supports or cradles are used inside the same aircraft, in order to deal with all the possible orientations and distances of the cable bundles in relation to the supporting walls. It is therefore necessary to provide a wide range of straight, double, angle and such like clips and supports which are costly to manufacture and store because of their very diversity. Despite that, since each support is intended to answer a single situation, this range, albeit extensive, cannot claim to cover all the infinitely varying situations encountered.

SUMMARY OF THE INVENTION

The object of the present invention is to provide a cable-supporting assembly which makes it possible, from a small number of elements, to compose a wide variety of supports adaptable to all the situations which may be encountered in the airframe of an aircraft as regards the orientation of the cable bundles, their distance in relation to the supporting partitions or walls, etc.

Another object of the present invention is to provide such an assembly which allows a large weight saving, this being an essential advantage on a modern aircraft.

Yet another object of the present invention is to provide such an assembly which affords a financial saving as regards both its production cost and its storage cost.

These objects of the invention and others which will emerge from the rest of the present description are achieved with a modular assembly for supporting electrical cables which comprises at least two elements respectively forming a mounting intended to be fastened to a supporting surface and a head shaped for receiving the cables. A stud fixed to one element is shaped to be received in a bush fixed to the other element, so as to ensure that the two elements are joined together. The assembly is characterized in that the stud possesses in succession, starting from its root, an annular rib and a toothed lateral surface which are coaxial, and in that the bush possesses in succession, starting from its top, an annular groove and a toothed inner lateral surface which are coaxial and which are shaped to complement the rib and the toothed lateral surface of the stud, to make it possible to insert the stud into the bush according to a relative angular orientation selected from those defined by the interacting toothed surfaces and to insert the rib forcibly into the groove so as to block the stud axially in the bush.

According to a preferred embodiment of the invention, a set of mountings, a set of heads and intermediate adapter elements, such as extension columns or crossmembers, are used. All these components can be joined to one another as a result of the compatibility of all the studs and of all the bushes formed on them. It is thus possible to construct a large number of different supporting assemblies by means of a small number of separate components which give these assemblies a modular character.

BRIEF DESCRIPTION OF THE DRAWINGS

Other characteristics and advantages of the present invention will emerge from a reading of the following description and from an examination of the accompanying drawing in which:

FIGS. 1 to 3 show a first embodiment of a generally triangular mounting designed to form part of the supporting assembly according to the invention, FIGS. 4, 5, and 6 show a head designed to serve as a cradle for a cable or for a cable bundle, this head being fastenable, for example, to the mounting of FIGS. 1 to 3, FIG. 7 shows one embodiment of a supporting assembly according to the invention, composed of the mounting of FIGS. 1 to 3 and of the head of FIGS. 4 to 6 in the joined together position, the head receiving a cable bundle to be maintained in a predetermined position relative to a surface to which the mounting is fastened, FIGS. 8 and 9 show a second embodiment of a generally triangular mounting designed to form part of an assembly according to the invention, FIGS. 10 and 11 show a first embodiment of a generally rectangular mounting which can be incorporated in a supporting assembly according to the invention, FIGS. 12 and 13 show a second embodiment of a generally rectangular mounting which can be incorporated in the assembly according to the present invention, FIG. 14 shows an extension column designed to form part of the assembly according to the present invention, and FIG. 15 shows a crossmember designed to make it possible to fasten a plurality of cables or cable bundles to the same mounting.

DETAILED DESCRIPTION OF PREFERRED EMBODIMENTS

Reference is made to FIGS. 1 to 3 of the accompanying drawing, in which FIG. 1 shows an elevation view of a mounting 1 designed to be fastened to the surface of a partition, wall or other structural element, for example of an aircraft. This mounting comprises a generally triangular plane base 2 and a bush 3 projecting perpendicularly from the plane of the base 2. Three holes 4, 5, 6 are pierced in the plane part 2, to allow the passage of members, such as screws, rivets, etc., making it possible to fasten the mounting to a plane surface. The face of the plane base 2 from which the bush 3 projects also has a slight rectangular depression 7 suitable for receiving inscriptions, where appropriate on a label, making it possible, for example, to identify the cables supported by the mounting.

FIG. 2 is a section, taken along the sectional line II—II of FIG. 1, of the bush which equips the mounting. FIG. 3 is an enlarged detailed view of the inner surface of the bush, taken according to the arrow F of FIG. 2. It emerges from these figures that the inner surface of the bush 3 is generally cylindrical and has a regular toothing, as is shown more clearly in FIG. 3.

This toothing 8 extends between the bottom of the bush and an annular groove 9 located in the vicinity of the mouth of this bush.

The mounting of such a shape is intended, for example, for receiving a head 10 illustrated in FIGS. 4 to 6 of the accompanying drawing. It can be seen from the front view of FIG. 4 that the head 10 consists of a V-shaped support or cradle 11 fixed to a stud or peg 12 shown in more detail in FIG. 6. It emerges from the side view of FIG. 5 that the support 11 comprises two parallel wings 11', 11" connected, on the one hand, by means of a base 11"' and, on the other hand, by means of a spacer 13 set apart from the base 11"' by a passage 14, the use of which will be explained later.

FIG. 6 shows edges 15 of teeth uniformly distributed over the periphery of the stud 12. These teeth extend parallel to the axis of the stud from the free end of the latter as far as a circular rib 16. According to the present invention, the toothing and the rib which are formed on the stud 12 are complementary with the toothing 8 and the groove 9 which are formed in the bush 3 of the mounting 1.

The mounting and the head can thus be joined together by pushing the stud of the latter into the bush of the mounting, until the rib 16 of the stud is forced to enter the groove 9 of the bush. The stud is then immobilised axially and in terms of rotation on the mounting. A suitable choice of the component material of the head and of the mounting allows such a forced coupling. As an example of such a material, mention may be made of polyamide 66 sold under the name of ZYTEL 103 by Messrs DU PONT DE NEMOURS.

Reference is now made to FIG. 7 of the accompanying drawing to explain the fitting of the supporting assembly according to the invention. This figure shows a profile view of the mounting 1 assumed to be fastened to a supporting surface (not shown) by means of fastening members passing through the holes 4, 5, 6. Broken lines represent a head 10 fitted forcibly onto the mounting in the way indicated above.

Before joining together, a spot of fluid adhesive can be poured into the bush of the mounting. The latter is then advantageously pierced with a hole 20 (see FIGS. 1 and 2) in its bottom, to allow the excess adhesive expelled by the stud to spread out outside the mounting.

Finally, FIG. 7 shows diagrammatically a bundle 17 of cables, for example electrical, which is fastened to the support 11 by means of a flexible strap 18 equipped with a keeper 19 of any known type. The strap 18 passes through the open passage 14 between the base 11"' and the spacer 13 (see FIG. 5). By tightening the strap, therefore, the cable bundle can be pressed onto the V-shaped seat defined by the wings 11', 11" of the support 11, to ensure the stability of the bundle on the head. Of course, by varying the aperture of the "V", the support 11 can be adapted to receive bundles of greater or lesser diameter.

The supporting assembly thus formed has a number of advantages. On the one hand, it makes it possible to orient the head about the axis of the bush of the mounting by means of the complementary toothings of the bush 8 and of the stud 12. The complementary teeth can each extend circularly, for example over 30°. With such teeth, the head can occupy twelve different positions on the mounting, and because of the symmetry of these positions and of the head 10 this corresponds to six separate effective positions. Such a possibility of orientation is of great value in that the position of the head can be matched to the direction followed by a cable or a cable bundle running parallel to a supporting surface, walls or partitions, for example of aircraft airframes. Furthermore, the angular positioning of the mounting no longer needs to be fixed accurately, thus making it easier to fasten the mounting to the supporting partition.

On the other hand, according to an essential characteristic of the present invention, the separation of the head and of the mounting into two components imparts to the assembly a modularity which affords a high flexibility of adaptation to situations in which the positions of the cables to be fastened in relation to the supporting partitions differ greatly. This modularity will be copiously illustrated in the rest of the present description in conjunction with FIGS. 8 to 15. Combining a small number of components in different ways provides a very large number of different supports perfectly adapted to all the situations encountered, as will be seen later.

Moreover, assembling a support by forcibly inserting a rib 16 into a groove 9 makes it possible easily and quickly to fix together the mounting and the head which, if appropriate, is removable in the event of a change of cabling (obviously, if adhesive has not been used).

FIGS. 8 to 13 illustrate other embodiments of the mounting which can be incorporated in the modular assembly according to the invention. In these figures, reference numerals identical to those used in FIGS. 1 to 7 relate to identical or similar elements or members. It thus emerges from the elevation view of FIG. 8 and from the front view of FIG. 9, which relate to an alternative version of the mounting in FIG. 1, that this alternative version differs from the mounting already described only in that the axis of the bush 3 is parallel to the base 2 of the mounting. The mounting shown in elevation in FIG. 10 and in a front view in FIG. 11 differs from that of FIG. 1 in that it is generally rectangular and not triangular and is pierced with only two fastening holes 4 and 5. Such a mounting is suitable when the fastening of the mounting to the supporting partition can be of lighter weight. FIGS. 12 and 13 correspond to FIGS. 10 and 11 and relate to an alternative version of the mounting shown in these figures, according to which alternative version the bush has an axis parallel to the base 2 of the mounting and not perpendicular to this.

FIG. 14 shows an extension column 21 essentially comprising, arranged in line along the same axis, a bush 3' and a stud 12' complementary with one another and conforming respectively to the bushes 3 and to the stud 12 of the preceding embodiments.

Angular locating ribs 22 can be arranged uniformly over the periphery of the column, moreover in exactly the same way as over the periphery of the bushes incorporated in the mountings described above.

FIG. 15 illustrates a multiple support 23 or crossmember, which comprises a stud 12" conforming to the studs 12 and 12' of the preceding embodiments and, for example, three bushes $3_1$, $3_2$, $3_3$ conforming to the bushes 3 and 3' of the preceding embodiments. The bush $3_1$ is coaxial and in line with the stud 12", whilst the bushes $3_2$ and $3_3$ are arranged as a mirror image on the same axis perpendicular to that of the stud 12" and of the bush $3_1$.

The mountings, heads, columns and crossmembers described above can be combined in a wide variety of configurations for the purpose of adaptation to different conditions for the support of cables. This capacity is essential especially in an aircraft where there are very long runs of electrical cables necessary for the supply and/or the interconnection of a large number of members or appliances. The topology of the cable passages must therefore be studied carefully, and it is necessary to arrange in the selected passages means for fastening these cables, which can be adapted to complex conditions of space. In the prior art, this purpose was served by multiplying the available types of support at the expense of the production and storage costs of these supports. The modular assembly according to the invention makes it possible, by varied combinations of a small number of elements, to have an extensive set of such supports which are of a reduced production and storage cost.

FIGS. 8 and 11 illustrate two constructions which can be obtained with the above-described components, only as an example because the possible constructions are very numerous since the assembly according to the invention makes it possible to support cables or cable bundles in any direction in space and parallel or perpendicular to the axis of one of the bush/stud pairs used in a supporting assembly according to the invention. In FIG. 8, a column 21 has been fitted to the mounting shown and a head 10 to the column 21. Of course, a plurality of columns could be slipped on end to end in order to vary the distance separating the head from the bush of the mounting. The head itself could be installed in all angular positions other than that shown. In FIG. 11, the mounting receives a crossmember 23, itself equipped with three heads 10. The number of cable bundles supported by the same mounting can thus be multiplied. Here too, one or more extension columns could be interposed between the crossmember and the mounting. Likewise, other crossmembers could be interposed between the heads and the mounting which are illustrated in FIG. 11.

In addition to the flexibility of adaptation and the financial savings already mentioned, which are obtained by the use of the modular assembly according to the invention, this assembly also makes it possible to reduce the total weight of the cable supports used, this being an additional advantage which is especially useful in an aircraft.

Of course, the invention is not limited to the illustrated embodiments which have been given only as an example. Thus, it would be possible to produce mountings with a plurality of bushes capable of receiving a plurality of heads, or heads with a plurality of studs allowing heads to be assembled in different positions. Furthermore, bushes and studs could be interchanged on the mountings, heads and other components described above.

I claim:

1. A modular assembly for supporting electrical cables comprising at least two elements
   one said element being a mounting for fastening to a supporting surface,
   the other said element being head shaped to receive said cables,
   a stud fixed to one of said elements and shaped to be received in a bush fixed to the other of said elements, said stud and bush being of a shape and size such that the stud is received in and detachably secured to the bush,
   said stud having an elongated generally cylindrical body with (a) a root at one end and a circular rib immediately adjacent said root; and (b) a toothed outer surface with a plurality of longitudinally extending teeth circumferentially spaced around said body,
   said bush having, in succession, starting from its top, an annular groove to receive said circular rib and a toothed inner surface to receive said toothed outer surface of said stud; the shape and size of said elements being such that the stud may be inserted into the bush at any one of a plurality of relative angular orientations selected from those defined by interfit of said toothed surfaces.

2. Assembly according to claim 1 in which, in the inserted position, the axis of the stud and the axis of the bush, in which this stud is inserted, is perpendicular to a bearing base of the mounting.

3. Assembly according to claim 1 in which, in the inserted position, the axis of the stud and the axis of the bush, in which this stud is inserted, is parallel to a bearing base of the mounting.

4. Assembly according to claim 1 including an element comprising at least one stud and at least one bush complementary with the stud.

5. Assembly according to claim 4 in which the element is in the form of an extension column equipped with a stud at one end and with a bush at the opposite end, so as to be insertable between a mounting and a head.

6. Assembly according to claim 4 in which the element is in the form of a crossmember comprising a stud and a plurality of bushes each suitable for receiving the stud of another element.

7. Assembly according to claim 1 in which the head-shaped element is in the form of a seat for one or more cables and has a passage for receiving a strap for fastening a cable or cables to the head.

8. Assembly according to claim 1 in which the element forming a mounting has a zone suitable for receiving an inscription.

9. Assembly according to claim 1 in which at least one of the stud and of a bush to be joined together is pierced with an expansion hole for a drop of adhesive to be poured into the bush before joining together.

10. The assembly of claim 1 in which said circular rib, when viewed in a radial cross-section, has a central portion of maximum diameter and a surface on each axial side therefore, said surface tapering toward the outer surface of said stud.

* * * * *